United States Patent [19]
Edgerley

[11] Patent Number: 5,669,534
[45] Date of Patent: Sep. 23, 1997

[54] UNDERSLUNG MOUNTING FOR A SPARE TIRE

[76] Inventor: John W. Edgerley, 661 Meadow Dr., Newark, Ohio 43055

[21] Appl. No.: 648,950

[22] Filed: May 16, 1996

[51] Int. Cl.⁶ .............................. B62D 9/00; B62D 11/00
[52] U.S. Cl. ............ 224/42.23; 224/42.2; 224/42.24; 224/42.25; 224/42.18; 224/42.12; 224/42.19; 296/37.3; 296/37.2; 414/463
[58] Field of Search ................ 224/42.18, 42.19, 224/42.2, 42.23, 42.24, 42.13, 42.12, 42.25, 282; 296/37.2, 37.3; 414/463; 220/352, 355, 356

[56] References Cited

U.S. PATENT DOCUMENTS

| | | | |
|---|---|---|---|
| 1,953,953 | 4/1934 | Carr | 296/64 |
| 2,049,458 | 8/1936 | Lyon | 224/42.2 |
| 2,631,886 | 3/1953 | Keller | 296/37.2 |
| 3,187,914 | 6/1965 | Peras | 214/451 |
| 4,548,540 | 10/1985 | Renfro | 224/42.2 |
| 4,687,124 | 8/1987 | Mahr | 296/37.2 |
| 5,513,788 | 5/1996 | Cochrane et al. | 224/42.23 |

Primary Examiner—Henry J. Recla
Assistant Examiner—Kam R. Shah
Attorney, Agent, or Firm—Kremblas, Foster, Millard & Pollick; Sidney W. Millard

[57] ABSTRACT

A spare tire for vans, trucks, and the like may be mounted in underslung position beneath the vehicle body. A framework to encompass the spare tire is mounted on a framework below the vehicle body. The spare tire is maintained in position by a conventional lifting mechanism, involving a lug on the end of a cable. A threaded stud projects downwardly from the lug to extend through an aperature in the bottom surface of a cup-shaped housing. A threaded nut tightens the housing against a panel mounted on the framework on the underside of the vehicle body, thereby, the spare tire is completely enclosed against the elements.

12 Claims, 1 Drawing Sheet

5,669,534

UNDERSLUNG MOUNTING FOR A SPARE TIRE

FIELD OF THE INVENTION

This invention involves mounting structure for the underslung storage of a spare tire on a vehicle.

BACKGROUND OF THE INVENTION

Spare tires used on vehicles of all kinds have been stored on the vehicle in various locations since the first one was invented. Indeed, recent spare tires are often much smaller in size than conventional tires and are intended for very short trips to the next tire repair station after a flat tire occurs.

Some spare tires are stored in an exterior compartment such as a covered well behind a front fender or above the rear bumper, behind the trunk lid.

Large trucks, pick-up trucks, vans and the like have storage space for a spare tire in the rear passenger section where the tire is not exposed to the elements.

The more recent and more conventional storage location for spare tires is in an underslung location between and slightly to the rear of the rear wheels, where the spare tire is mounted in horizontal position. The tire is supported in place against a lower framework mounted on the vehicle by a cable projecting upward through an opening in the vehicle body to a lifting mechanism. A cable projects downwardly from the lifting mechanism through an opening in the vehicle body to terminate at its lower end in an attachment to a lug. The lug is of a size and configured to slip sideways through the central aperature in a conventional vehicle wheel. After it slips sideways through the vehicle wheel it is allowed to swing free. The cable is attached to the center of the lug. Thus when the cable is drawn upward the lug projects transversely in both sides beyond the edge of the central opening in the wheel. Thereby the lug engages the underside of the wheel and the lifting mechanism draws the cable upward to pull the tire into place in underslung position under the body of the vehicle.

This conventional mechanism certainly works to accomplish the desired result of storing the tire in an accessible location. When a flat occurs in one of the supporting tires, the vehicle operator simply works the lift mechanism to allow the tire to descend to the road bed still supported by the cable and lug. Then the slack cable allows the lug to be manipulated such that it passes through the central opening of the wheel and the wheel may be withdrawn to the rear or side of the vehicle and mounted in operative position to replace the flat tire.

The problem with the conventional mechanism used in modern vans is the dirt, rust, and the occasional snow, rain, and ice which accumulates on the spare tire during normal operations of the vehicle. What is desirable is for the spare tire to be protected from the elements such that the tire may be changed by the vehicle driver without getting completely dirty in the process.

A patent to Peras, U.S. Pat. No. 3,187,914 discloses an underslung spare tire support mounted in a compartment which may be pivoted into storage location beneath a chassis frame of the vehicle. It swings into position on a pair of pivoting support links connected to each side of the tire support compartment.

A patent to Carr, U.S. Pat. No. 1,953,953 discloses a side mounted pivoting support for a spare tire. A pivoting support swings about a vertical axis and is configured to be mounted under the vehicle chassis and immediately beneath the trunk.

SUMMARY OF THE INVENTION

This invention solves the problem of isolating the spare tire from the elements, while still mounting the spare tire under the body of the vehicle and preferably between and to the rear wheels of the vehicle. This is accomplished by a simple modification of existing apparatus.

Existing apparatus briefly described above includes a lifting mechanism above the chassis floor and allows a strand or cable to project downwardly from the lifting mechanism through an opening in the chassis. The strand extends downwardly to terminate in a lug. The lug is structured to slide through the hole in the center of the wheel supporting the spare tire and then be rotated to a position transverse to the axis of its attached strand and the axis of the hole through the wheel. Thereby the lifting mechanism can retract the strand and pull the wheel into place on the bottom of the chassis frame by lifting the lug which supports the wheel.

The added structure of this invention is a compartment comprised of an upper generally horizontal plate bolted to the frame work on the underside of the chassis. A cup-shaped or bowl-like housing, having a bottom wall and a circumferentially extending sidewall projects upwardly to engage the upper plate and together they completely enclose the spare tire.

The cup-shaped housing is drawn upward into engagement with the upper plate by a nut which threads to the lower end of a stud which projects downwardly from the aforementioned lug on the lower end of the support strand. The threaded stud projects through a centrally located aperature in the bottom wall of the housing and the nut tightens against the exterior bottom wall to push the housing upward into sealing engagement with the upper plate which is secured to the framework.

Objects of the invention not understood from the above will be appreciated fully by a review of the drawings and the description of the preferred embodiment which follows.

DESCRIPTION OF THE PREFERRED EMBODIMENT

This invention is intended to provide a semi-sealed compartment to be mounted on a vehicle in underslung position.

Figure 1:
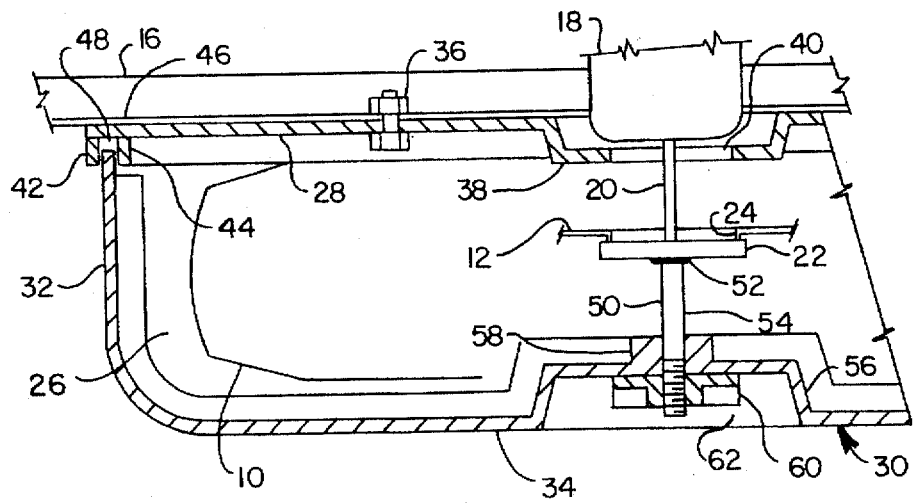
FIG. 1 is a fragmentary sectional view taken along line 1—1 of FIG. 2.
Figure 2:
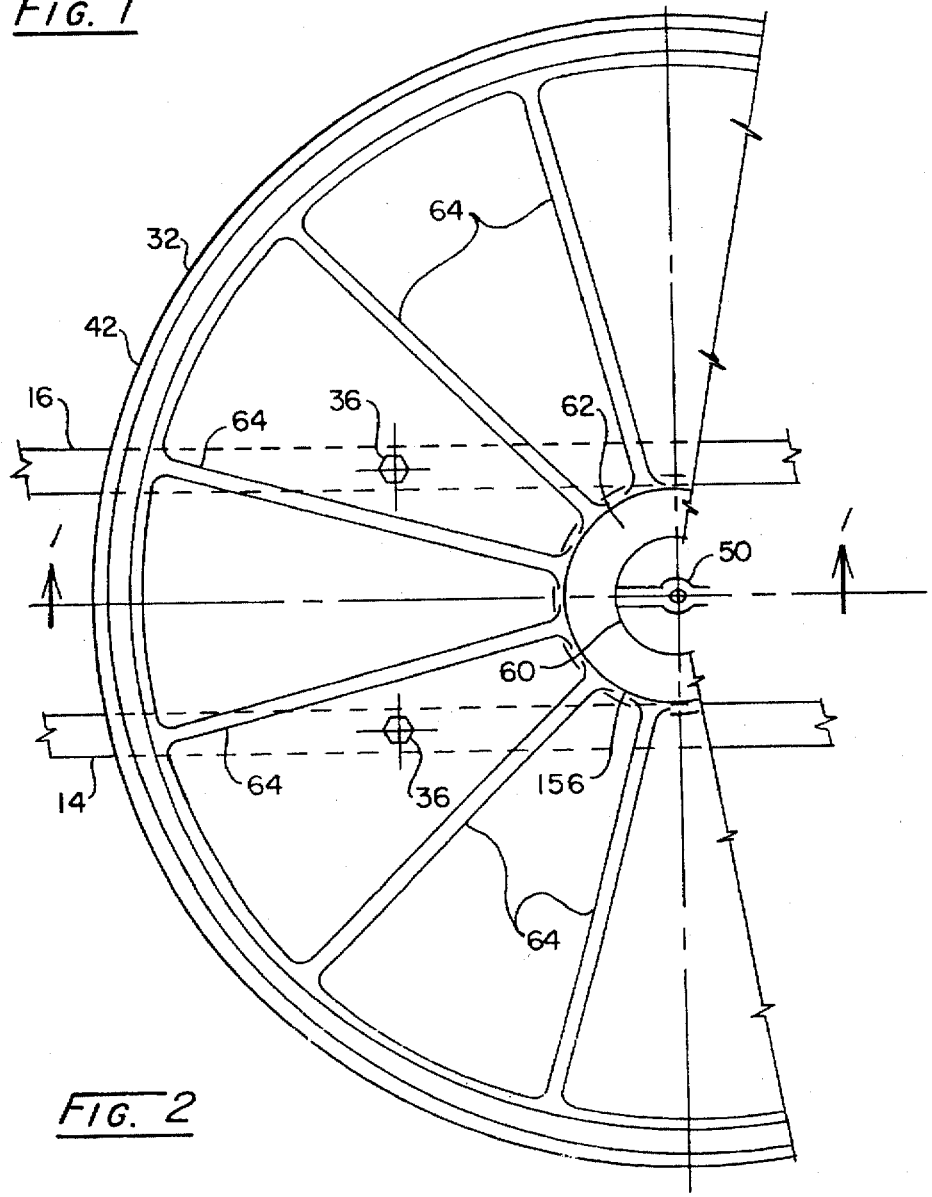
FIG. 2 is a fragmentary bottom plan view of the housing of this invention.

FIG. 1 illustrates a conventional vehicle tire 10 mounted on a hub or wheel 12 supported in underslung position under frame cross members 14, 16.

A conventional lift mechanism shown schematically at 18 may be manually, mechanically, or electrically operated. It has a strand 20 which may be a cord, cable, or wire projecting downwardly from the lift mechanism 18 to be mechanically attached to a lug 22. Ordinarily, the lug 22 is a rectangular metal piece with the strand 20 attached at about its center as shown in FIG. 1. Lug 22 spans across the central opening 24 in wheel 12 to engage the underside of the wheel as it is lifted into storage position as strand 20 is lifted by lift mechanism 18. In order to pass through opening 24 in wheel 12, the lug 22 is always tilted sideways. Such operations are well known in the industry and need not be explained here.

This invention intends to enclose the mounted spare tire 10 within a semi-liquid tight compartment 26. The compartment is comprised of an upper, generally flat plate 28 and a lower generally cup-shaped housing 30. The housing is comprised of a generally vertically, projecting side-walls 32 circumscribing the tire 10 and being joined at its lower surface by a bottom wall 34.

As illustrated in the drawings, the flat upper plate 28 is secured to the frame 14, 16 by a plurality of nut and bolt combinations 36. A central downwardly extending boss 38 provides some structural stability to plate 28 and accommodates the lower section of the lift mechanism 18. In addition it has a central opening 40 to allow the free vertical movement of strand 20.

At the radially outer edge of plate 28 is a downwardly projecting, circumferentially extending outer flange 42. Inwardly spaced from flange 42 is a concentrically aligned second flange 44 which is also downwardly projecting, and circumferentially extending such that the two flanges 42, 44 provide a cavity to receive the upper edge 46 of phalange 42 in sealing engagement, with a U-shaped seal 48. Together flanges 42 and 44, seal 48, and the upper edge 46 of sidewall 32 serve to seal compartment 26 from outside elements which might rust or otherwise contaminate tire 10 and wheel 12 with water, oil and other road debris. The only intended exposure to compartment 26 is through central opening 40 and under ordinary circumstances essentially no contaminating muddy water, ice or snow will migrate to the interior of the compartment 26.

In order to provide a mounting mechanism for housing 30, a threaded stud 50 is welded or otherwise secured at 52 to the underside of lug 22 and projects downwardly through aperature 54 in a reinforced boss 56 projecting upwardly from the bottom-wall 34. The reinforcement in the form of a washer shaped projection 58 serves to strengthen the bottom wall 34 where the most pressure is applied by a nut 60 threaded to stud 50.

It will be observed that the upwardly projecting boss 56 provides a recess 62 for nut 60. Recess 62 prevents the nut 60. from projecting below bottom wall 34 where it might snag on things passing under the vehicle. The nut sheilding feature of recess 62 is in addition to the rigidity it adds to housing 30. To provide additional structural stability for the bottom wall, radially extending spokes or ridges 64 are formed in the bottom wall.

As a result of this unique spare tire mounting feature, a vehicle operator can replace a flat tire with one which is relatively clean. The mud and slush from the road surface cannot reach tire 10. Indeed, if the spare tire changing location is particularly muddy, the housing 30 may sit on the muddy surface and the tire may be lowered into it. Housing 30 can slide to the flat tire without dirtying tire 10. Then the flat tire can be removed and the clean spare tire mounted in place. Then the dirty flat tire can be laid in housing 30 and lifted into the passenger compartment or mounted as shown in FIG. 1 for transportation to a flat repair facility. This feature allows some flexibility to the vehicle operator because the muddy flat tire can be easily lifted into the passenger compartment while in the housing where it can sit without dirtying the carpeting. It may be inconvenient to remount the flat tire in underslung position as shown in FIG. 1 before it is repaired. Ordinarily, the tire repairman will remount the repaired tire and the vehicle operator can minimize his/her inconvenience.

Having thus described the invention in its preferred embodiment, modifications will be obvious to those having ordinary skill in the art. It is not intended that the drawings used to show the invention nor the words used to describe the same be limiting on the scope of the invention. Rather, it is intended that the invention be limited only by the scope of the appended claims.

I claim:

1. A support and storage compartment for a spare wheel of a vehicle, having a frame secured to the underside of said vehicle said compartment being attachable to the frame to support said wheel in a generally horizontal orientation, said compartment including a vertical sidewall, an upper plate and a bottom wall, said wheel including a hub and a tire, said tire being mounted on the periphery of said hub, said upper plate being adapted to be secured to said frame and including a central opening to accommodate the vertical movement of a support strand, said strand having an upper end secured to a wheel lifting mechanism and a lower end secured to a lug, said lug engaging the lower side of a hub to support said wheel, said lug including a downwardly extending threaded stud, said stud extending downwardly through a central aperature in said bottom wall, a threaded nut threaded to said stud and pressing upwardly against said bottom wall to press said bottom wall, sidewall and upper plate together to form a liquid impermeable compartment except for said central opening in said plate.

2. The compartment of claim 1 including a boss formed in said bottom wall circumscribing said central aperature, stiffening ridges formed in said bottom wall extending radially from said boss.

3. The compartment of claim 2 wherein said plate includes a circumferentially extending first flange projecting downwardly from said plate parallel with said sidewall, said seal being located between said sidewall and said flange.

4. The compartment of claim 3 including a second flange projecting from said plate parallel with said first flange, said upper edge of said sidewall being sandwiched between said first and second flanges to sealingly engage said seal.

5. The compartment of claim 2 wherein said bottom wall and said sidewall are formed integral, said sidewall having an upper edge, a circumferentially extending seal engaging said upper edge and said plate to form a seal against the passage of liquid due to road splashes and the like.

6. The compartment of claim 5 wherein said plate includes a circumferentially extending first flange projecting downwardly from said plate parallel with said sidewall, said seal being located between said sidewall and said flange.

7. The compartment of claim 6 including a second flange projecting from said plate parallel with said first flange, said upper edge of said sidewall being sandwiched between said first and second flanges to sealingly engage said seal.

8. The compartment of claim 1 wherein said bottom wall and said sidewall are formed integral, said sidewall having an upper edge, a circumferentially extending seal engaging said upper edge and said plate to form a seal against the passage of liquid due to road splashes and the like.

9. The compartment of claim 8 wherein said plate includes a circumferentially extending first flange projecting downwardly from said plate parallel with said sidewall, said seal being located between said sidewall and said flange.

10. The compartment of claim 9 including a second flange projecting from said plate parallel with said first flange, said upper edge of said sidewall being sandwiched between said first and second flanges to sealingly engage said seal.

11. The compartment of claim 1 wherein said plate includes a circumferentially extending first flange projecting downwardly from said plate parallel with said sidewall, said seal being located between said sidewall and said flange.

12. The compartment of claim 11 including a second flange projecting from said plate parallel with said first flange, said upper edge of said sidewall being sandwiched between said first and second flanges to sealingly engage said seal.

* * * * *